United States Patent

Mazziotti

[15] 3,691,788

[45] Sept. 19, 1972

[54] STAY-RITE FLEX JOINT

[72] Inventor: Ralph Mazziotti, 362 Park Ave., Midland Park, N.J. 07432

[22] Filed: Sept. 10, 1970

[21] Appl. No.: 71,142

[52] U.S. Cl. .................................... 64/7, 269/75
[51] Int. Cl. ........................................ F16d 3/10
[58] Field of Search ............. 64/7, 8, 9 R, 21; 269/75

[56] References Cited

UNITED STATES PATENTS 2,526,105  10/1950  Adams ........................ 64/7
1,813,209  7/1931  Spase .................... 64/27 C X

*Primary Examiner*—John J. Camby
*Assistant Examiner*—W. C. Anderson

[57] ABSTRACT

A novel universal joint which can be positioned at any angle without loss of efficiency by becoming limp at the far end of an extension secured thereto, the device including a spherical ball having a series of annular grooves therearound, the ball being integral with a pronged bushing attachable to one end of a lever, and a pronged claw being fitted around the spherical ball, the claw supporting a spring loaded detent ball urged against an annular groove of the spherical ball.

1 Claim, 8 Drawing Figures

PATENTED SEP 19 1972 3,691,788
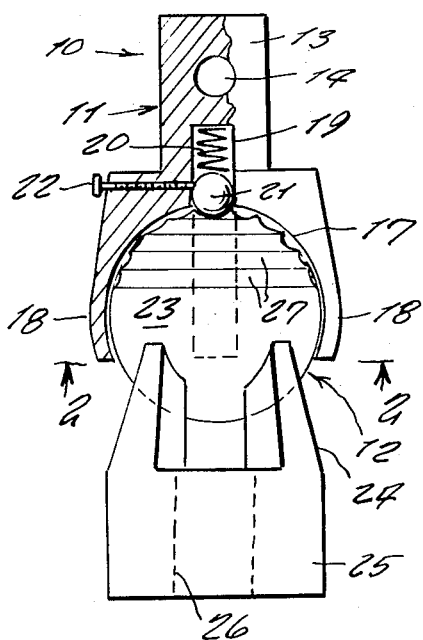
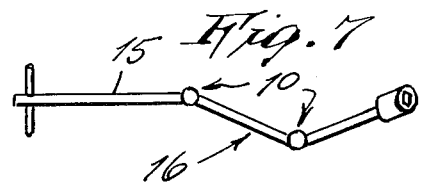
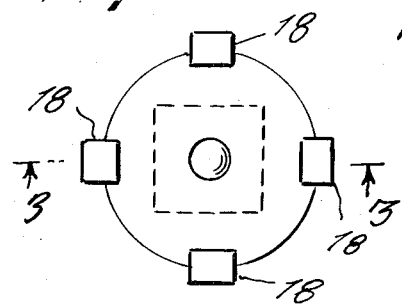
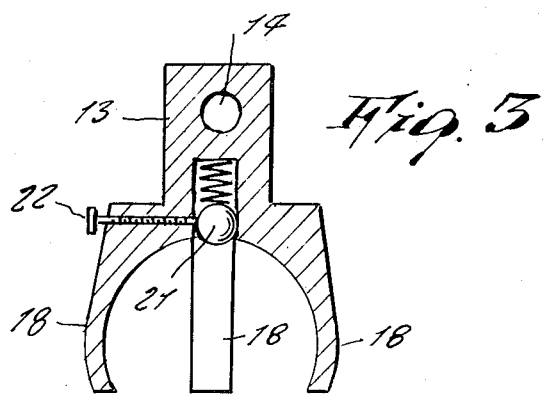
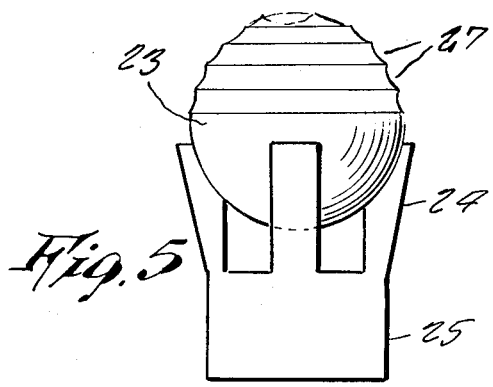
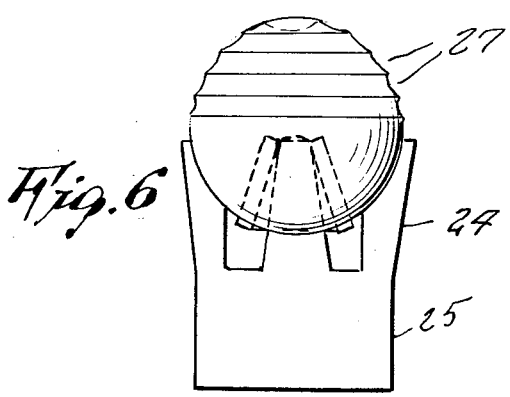
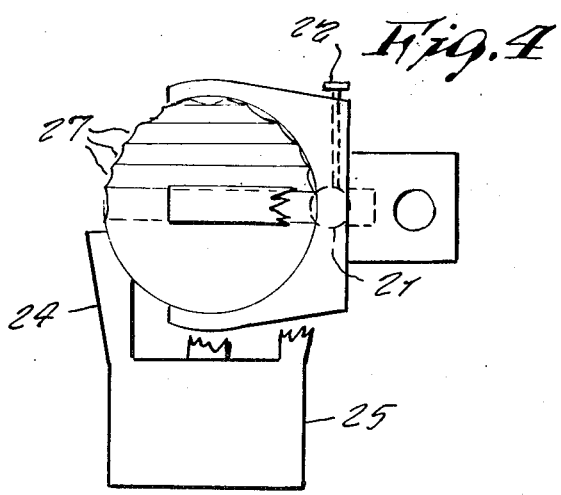
INVENTOR
RALPH MAZZIOTTI

STAY-RITE FLEX JOINT

This invention relates generally to universal joints.

A principal purpose of the present invention is to provide a stay-rite flex joint having advantages over standard universal joints in that the outer extremity of a lever attached thereto does not flop but is retained at a selected angle and does not go limp thereby losing no efficiency.

Another purpose of the present invention is to provide a stay-rite flex joint that is particularly suitable in the construction of the socket wrenches and which are intended to gain access to out-of-the-way places.

Another purpose of the present invention is to provide a stay-rite flex joint which is also applicable to screw drivers and other tools that require angle action.

Other objects of the present invention are to provide a stay-rite flex joint which is simple in design, inexpensive to manufacture, rugged in construction, easy to use and efficient in operation.

These and other objects will be readily evident upon a study of the following specification together with accompanying drawing wherein:

FIG. 1 is a side elevation view of the assembly shown partly in cross-section;

FIG. 2 is a view in the direction 2—2 of FIG. 1 and showing the pronged claw member;

FIG. 3 is a cross-sectional view thereof taken on the line 3—3 of FIG. 2;

FIG. 4 is a side view of the assembly showing the joint tilted to a 90° angle;

FIG. 5 is a side elevation view of a pronged bushing member of the assembly;

FIG. 6 is a similar view of a slightly modified form thereof; and

FIG. 7 is a side elevation view of a socket wrench which incorporates the present invention; and FIG. 8 is an enlarged cross-sectional view showing the teeth detail of the present invention.

Referring now to the drawing in detail, the reference numeral 10 represents a stay-rite flex joint, according to the present invention, wherein there is a pronged claw member 11 and a pronged bushing and spherical ball member 12 which are adjustably retained together so to form a special and novel universal joint.

The pronged claw member 11 includes a cross-sectionally square extension 13 provided with detent opening 14, the extension 13 being adaptable for engaged to one end of a lever 15 of a conventional socket wrench 16 or other tool such as a screw driver that requires angle action, not shown.

The pronged claw member includes a generally hemispherical pocket 17 formed by means of four claws 18 which are integral with the extension 13. An axially extending central opening 19 is adapted for receiving a compression coil spring 20 which normally bears against a spherical detent ball 21 positioned within the entrance of the opening 19. A set screw 22 is adaptable for positioning the detent ball in rigid position relative to the spherical ball member 12 so that the universal joint is retained at a desired angle position.

The spherical ball member 12 includes spherical ball 23 which is integral with a plurality of prongs 24 which at their other ends are integral with a bushing 25 having a central axially extending opening 26 so that the same may be mounted upon the end of a lever 15 or other member. The outward end of the ball 23 is provided with a series of annular rings or grooves 27 and which are adaptable for receiving the detent ball 21, depending on the respective angle of inclination of the pronged claw respective to the ball 23. Thus for example as shown in FIG. 4 of the drawing, when the pronged claw is tilted at a 90° angle respective to the axis of the bushing 25, the detent ball 21 is fitted into the largest diameter groove 27 and is retained fixedly within the groove by means of the set screw 22 being screwed down hard against the detent ball so to establish a firm hold between the parts.

Thus there is provided a stay-rite flex joint of novel construction. Thus there is provided a novel joint wherein the greatest advantage is that it stays in a set position at the end of a long extension and is smooth in operation.

What I now claim is:

1. In a stay-rite flex joint, the combination of a pronged claw member, a pronged bushing member and means for adjustably affixing said members together so that there is no loose play therebetween, said pronged claw comprising an elongated cross-sectional square configurated element which at its one end is provided with four prongs formed around a generally spherical central pocket, and an axially extending central opening communicating with said pocket and containing a compression coil spring and a spherical detent ball, said detent ball being retained in a fixed position by means of a set screw, said pronged bushing member comprising a spherical ball rotatably fitted into said spherical pocket, said ball being integral with the outer ends of a plurality of prongs which at their opposite ends are integral with a bushing having a central opening for being secured to one end of an extension lever, and said spherical ball being provided with a series of parallel annular grooves therearound, said annular grooves being selectively aligned with said detent ball for receiving said detent ball when said bushing member is moved annularly in any spherical direction respective to said pronged claw member.

* * * * *